Figure 1:
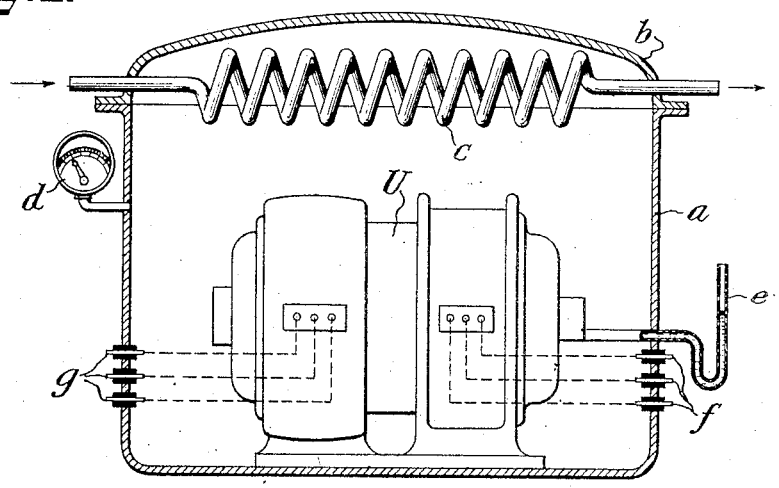

Apr. 24, 1923.

M. SCHULER 1,453,083

ELECTRIC MACHINE

Filed Oct. 25, 1916

Witnesses:

Inventor:
Max Schuler
By his Atty.

Patented Apr. 24, 1923.

1,453,083

UNITED STATES PATENT OFFICE.

MAX SCHULER, OF NEUMUHLEN, NEAR KIEL, GERMANY, ASSIGNOR TO ANSCHUTZ & CO., OF NEUMUHLEN, NEAR KIEL, GERMANY.

ELECTRIC MACHINE.   REISSUED

Application filed October 25, 1916. Serial No. 127,682.

(GRANTED UNDER THE PROVISIONS OF THE ACT OF MARCH 3, 1921, 41 STAT. L., 1313.)

*To all whom it may concern:*

Be it known that I, MAX SCHULER, a subject of the Emperor of Germany, residing in Neumuhlen, near Kiel, Germany, have invented certain new and useful Improvements in Electric Machines (for which I have filed an application for German patent September 22, 1915), of which the following is a specification.

With electric machines having a great number of revolutions and great circumferential velocities of the armature or with considerable output, it often proves difficult to sufficiently cool the armature by air. The electric losses comprise the heating of the armature by air friction and the work of forcing the necessary cooling air through the parts to be cooled. Also the air used for cooling is heated by the ventilating apparatus and the air friction, and the cooling action of the air is thereby diminished. For such reasons, it becomes necessary to increase the ventilation, the result being a corresponding increase also of the power consumed in the ventilation and a diminution of the efficiency of the machine. With high-speed machines, such, for instance, as high-frequency transformers, it may even become necessary to reduce the number of revolutions of the armature more than its stability requires, and more than it is desirable from the electric point of view in order to prevent too great a rise in temperature. It is true that it has been proposed to have such machines run in vacuo, but that will not bring the desired result, for while it is true that the air friction will diminish proportionately the air-pressure, the heat-conductivity of the air will be lowered in the same proportion.

For these reasons the armature of electric machines of this kind is, according to the present invention, made to run in hydrogen, the physical constants of which are much more favorable than those of the air. Since the power consumed in ventilation is diminished in proportion to the specific weight, it amounts, with hydrogen, to only the fourteenth part of that of the air. Furthermore the viscosity of hydrogen is only half that of the air. On the other hand the heat-conductivity of hydrogen is $7\frac{1}{2}$ times that of the air and the specific heat of 1 gram of hydrogen is about $14\frac{1}{2}$ times that of 1 gram of air.

At the same time we obtain, with machines running in contact with hydrogen, the further great advantage that metals and oils do not enter chemical combinations with hydrogen; consequently the collectors and the slip rings remain always bright, nor will the oils in the bearings turn resinous or become altered.

In certain cases further special advantages are attained. With the already mentioned high-frequency transformers for wireless telegraphy the casing and enclosing of the hydrogen produces a very considerable silencing action, so that the reception of incoming signals is facilitated.

The hydrogen is intended to act as a medium for the carrying-off of heat from the rotating armature to the casing. With this in view, the magnet-shell may be constructed as a gas-tight casing or the machine may be fitted in a separate gas-tight container. The container must yield heat to the air for which purpose it may be provided with cooling ribs. Should the surface, however, not be sufficient for the carrying-off of the heat, the shell may be provided with suitable water-cooling or heat radiating means. The arrangement may also be made in such manner that the armature acts as a fan for circulating the heated hydrogen through external or internal cooling devices and again drawing the cooled hydrogen into the machine.

Figure 2:
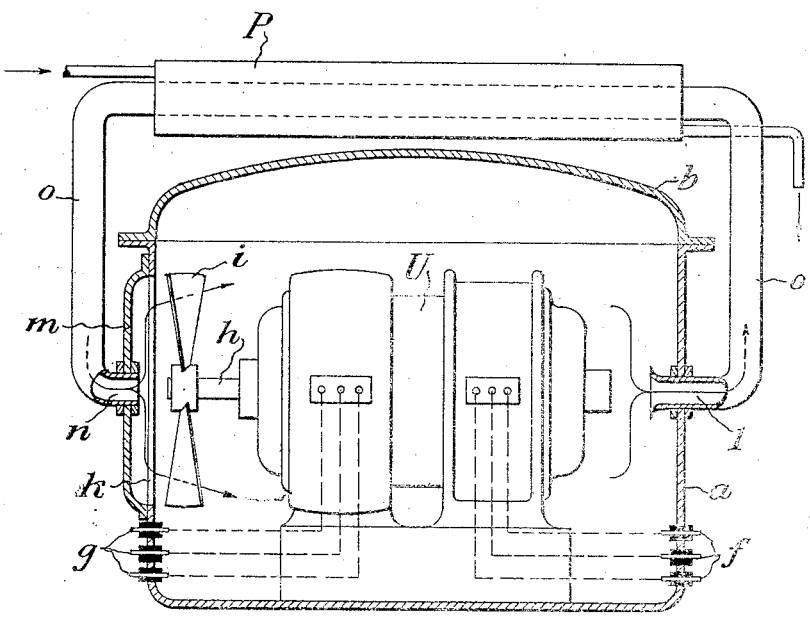

In the subjoined drawing, Figures 1 and 2 are longitudinal vertical sectional views of two embodiments of the invention.

U in Fig. 1 being an electric machine, for instance, a transformer for high-frequency current. This machine is mounted in a casing $a$, closed by a lid $b$. This casing is air-tight and filled with hydrogen through openings (not shown). A pressure-gauge $d$ permits of reading the pressure and—for a known pressure at a normal temperature—the reading of the temperature of the hydrogen. The pressure-gauge $d$ may therefore be provided, beside the pressure-scale, also with a temperature-scale. The transformer U is a normally ventilated electric machine. By enclosing the transformer in hydrogen, the heat emission becomes a multiple of that of the air, and the machine may therefore be considerably more loaded and it will be possible to attain higher circumferential velocities of the armature. For carrying off the heat from the hydrogen, the lid $b$ is provided with a radiator, in the form of a coil $c$ through which cooling water continually flows. Furthermore $f$ and $g$ are the current leads to and from the transformer, while $e$ is an oil-gauge, permitting of lubricating the bearings without any air entering the casing $a$.

In the embodiment of Fig. 2, a fan $i$ is provided on the shaft $h$ of the machine U, which fan is placed immediately in front of a lateral opening $k$ of the casing $a$. Upon the opposite side of the casing there is provided an opening $l$. The opening $k$ is closed by a lid $m$ having an opening $n$. The openings $l$ and $n$ are connected to each other by a pipe $o$, inserted gas-tight in said openings $l$ and $n$. This pipe leads through any cooling device, for instance, a receptacle $h$, through which cooling water is fed. The casing $a$ and the pipe $o$ are filled with hydrogen as before. When the machine is working, the fan $i$ will suck hydrogen out of the pipe $o$, said hydrogen being delivered across the casing $a$ and again into the pipe $o$. In this circulation the hydrogen is cooled in the cooling device P.

A pressure-gauge, such as $d$ in Fig. 1, and an oil gauge, such as in Fig. 1 can, as a matter of course, be provided.

The higher the pressure the hydrogen is submitted to, the more heat will be carried off by it, but the greater will be the power consumed in ventilation with the same machine. Consequently one gains by an alteration of the pressure of the hydrogen, a means for limiting the heating of the machine, making good the electric losses, more fully utilizing the machine, and attaining higher efficiency than heretofore possible.

What I claim is:

In combination, a casing having an electric machine therein; hydrogen gas in said casing as a cooling medium; and means within said casing for cooling the hydrogen.

In witness whereof I have hereunto signed my name this seventeenth day of July 1916, in the presence of two subscribing witnesses.

MAX SCHULER.

Witnesses:
WOLFGANG OTTO,
AGNES RÖHN.